United States Patent
Park et al.

(10) Patent No.: US 11,092,952 B2
(45) Date of Patent: Aug. 17, 2021

(54) PLANT ABNORMALITY DETECTION METHOD AND SYSTEM

(71) Applicant: DOOSAN HEAVY INDUSTRIES & CONSTRUCTION CO., LTD., Changwon-si (KR)

(72) Inventors: Jee Hun Park, Gwangmyeong-si (KR); Young Min Kim, Incheon (KR); In Suk Cho, Yongin-si (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 351 days.

(21) Appl. No.: 16/082,267

(22) PCT Filed: Aug. 26, 2016

(86) PCT No.: PCT/KR2016/009554
§ 371 (c)(1),
(2) Date: Sep. 4, 2018

(87) PCT Pub. No.: WO2017/191872
PCT Pub. Date: Nov. 9, 2017

(65) Prior Publication Data
US 2019/0101908 A1 Apr. 4, 2019

(30) Foreign Application Priority Data
May 4, 2016 (KR) .................. 10-2016-0055411

(51) Int. Cl.
*G05B 23/02* (2006.01)
*G06Q 50/10* (2012.01)
(Continued)

(52) U.S. Cl.
CPC .......... *G05B 23/027* (2013.01); *G05B 23/02* (2013.01); *G05B 23/0281* (2013.01); *G06N 7/00* (2013.01);
(Continued)

(58) Field of Classification Search
None
See application file for complete search history.

(56) References Cited

U.S. PATENT DOCUMENTS 5,764,509 A * 6/1998 Gross ................. G05B 23/0262
700/29
8,014,880 B2 * 9/2011 Samardzija .......... G05B 23/024
700/17
(Continued)

FOREIGN PATENT DOCUMENTS

JP 2006-135412 A 5/2006
JP 2006-258535 A 9/2006
(Continued)

OTHER PUBLICATIONS

JP 2006135412 A—translation (Year: 2006).*

*Primary Examiner* — Lina M Cordero
(74) *Attorney, Agent, or Firm* — Invenstone Patent, LLC

(57) ABSTRACT

The present disclosure provides a plant abnormality detection system and method, which can learn the plant data collected in real time through a plurality of prediction models having different characteristics to generate a prediction value having the highest accuracy to diagnose the abnormality thereof, thus detecting accurately the abnormality of the plant to early provide alarm.

The plant abnormality detection system disclosed includes a data collection unit for collecting the plant data, a learning model selection unit for selecting a plurality of models in order to predict a value of the plant data, and an abnormality alarm unit including a prediction algorithm unit having a
(Continued)

plurality of prediction algorithms, an ensemble learning unit for outputting a final prediction data by performing ensemble learning based on the prediction data outputted from the prediction algorithm unit, and an alarm logic for determining whether or not the plant is abnormal by comparing the data collected in the data collecting unit with the final prediction data.

10 Claims, 7 Drawing Sheets

(51) Int. Cl.
*G08B 21/18* (2006.01)
*G06Q 10/04* (2012.01)
*G06N 20/20* (2019.01)
*G06N 7/00* (2006.01)

(52) U.S. Cl.
CPC ............ *G06N 20/20* (2019.01); *G06Q 10/04* (2013.01); *G06Q 50/10* (2013.01); *G08B 21/18* (2013.01)

(56) References Cited

U.S. PATENT DOCUMENTS

| 8,515,719 | B2* | 8/2013 | Tamaki ............. G05B 23/0254 703/6 |
| 10,496,791 | B2 | 12/2019 | Das |
| 2007/0250292 | A1* | 10/2007 | Alagappan ............. C10B 55/00 702/184 |
| 2007/0265713 | A1 | 11/2007 | Veillette et al. |
| 2014/0142904 | A1* | 5/2014 | Drees ..................... G06Q 50/06 703/2 |
| 2014/0258187 | A1* | 9/2014 | Suleiman ............ G06F 11/3447 706/12 |
| 2015/0100284 | A1 | 4/2015 | Teravainen et al. |
| 2016/0203036 | A1* | 7/2016 | Mezic .................... G06N 20/00 714/819 |
| 2017/0161963 | A1* | 6/2017 | Green .................... G07C 5/004 |
| 2017/0308802 | A1* | 10/2017 | Ramsoy ................ G06N 20/20 |

FOREIGN PATENT DOCUMENTS

| JP | 2009-512097 A | 3/2009 |
| JP | 2011-227706 A | 11/2011 |
| JP | 5484591 B2 | 5/2014 |

* cited by examiner

[FIG. 1]
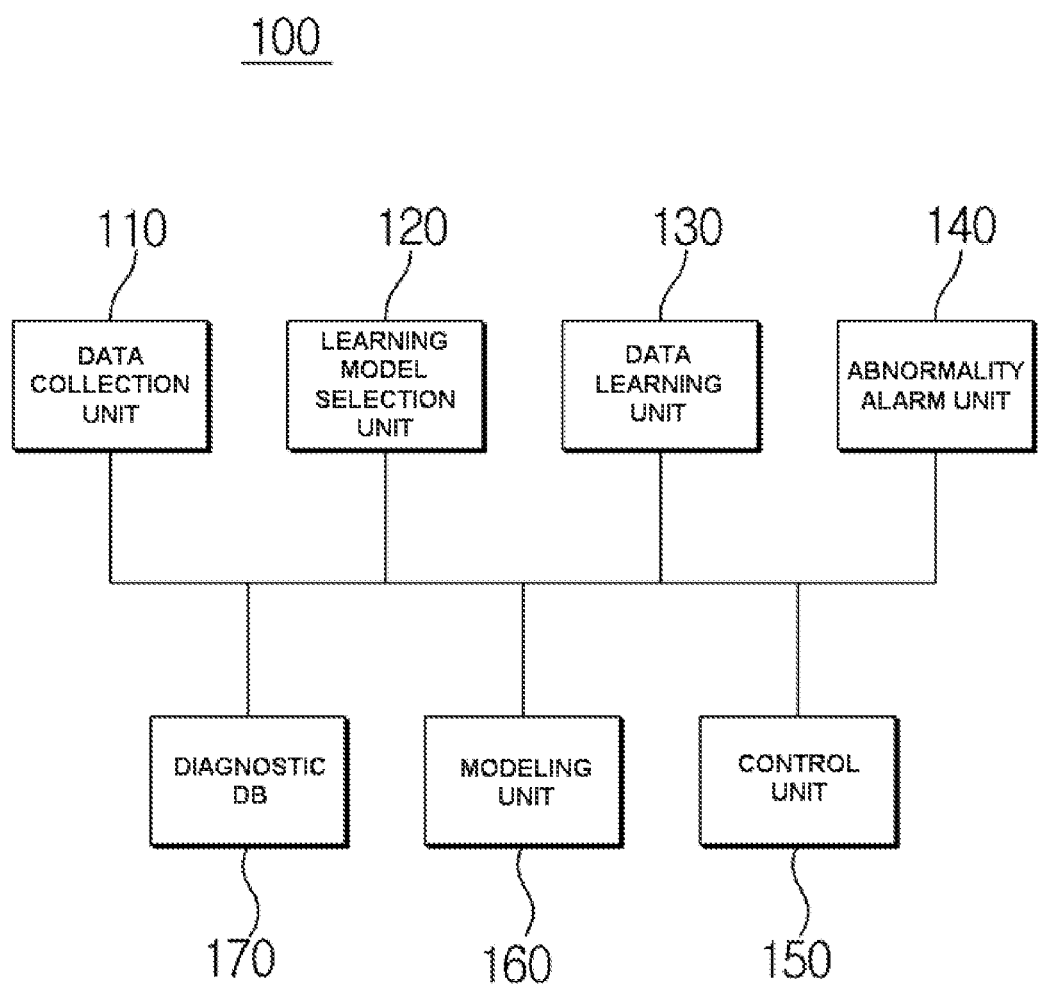

[FIG. 2]
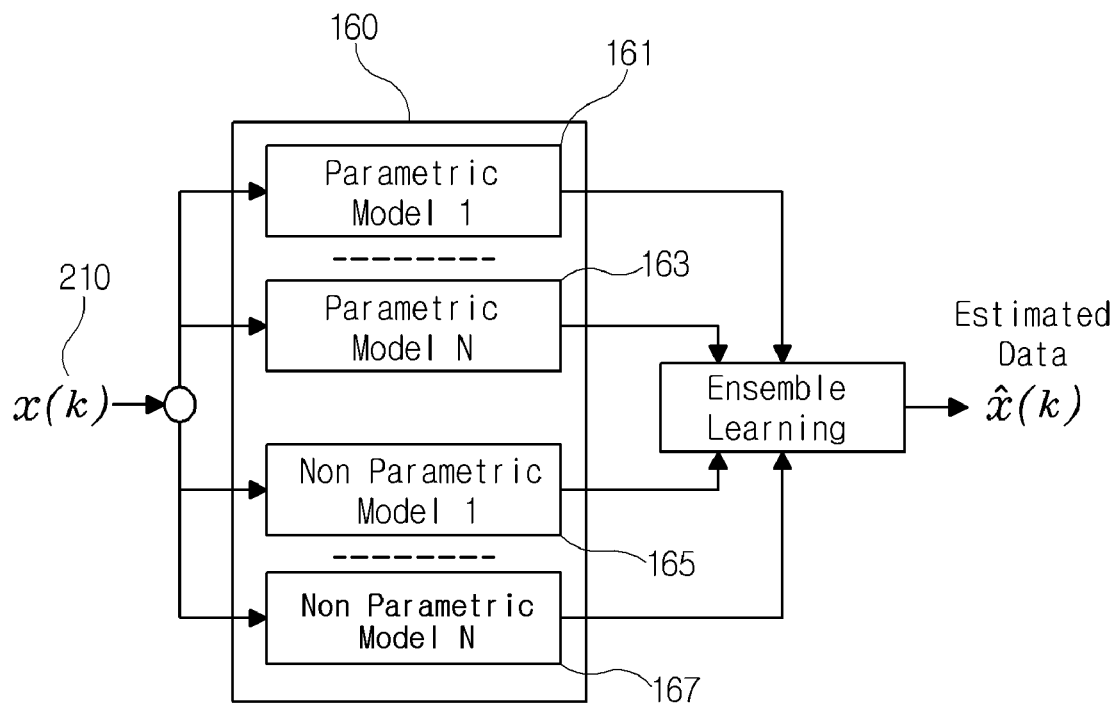

[FIG. 3]
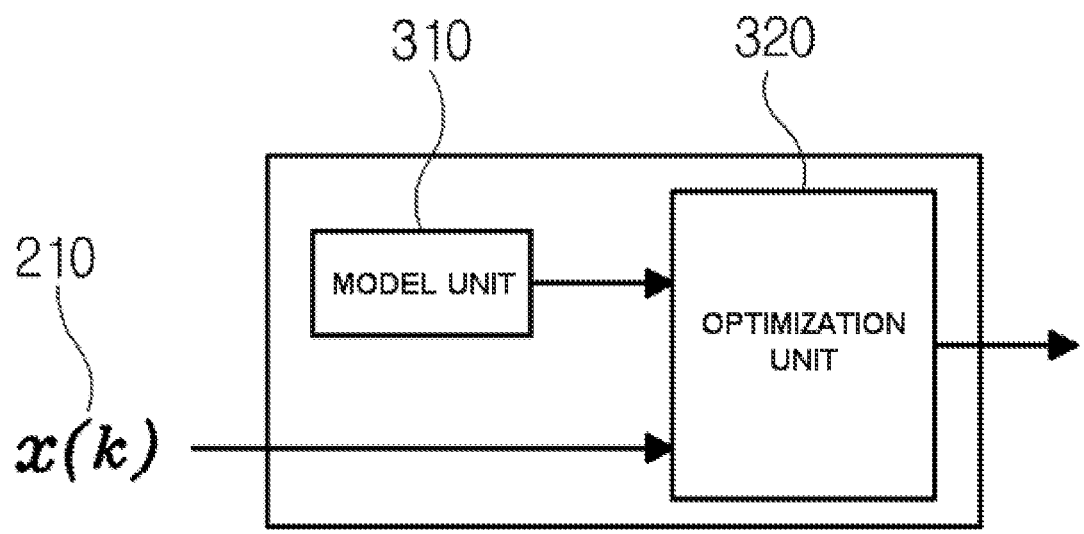

[FIG. 4]
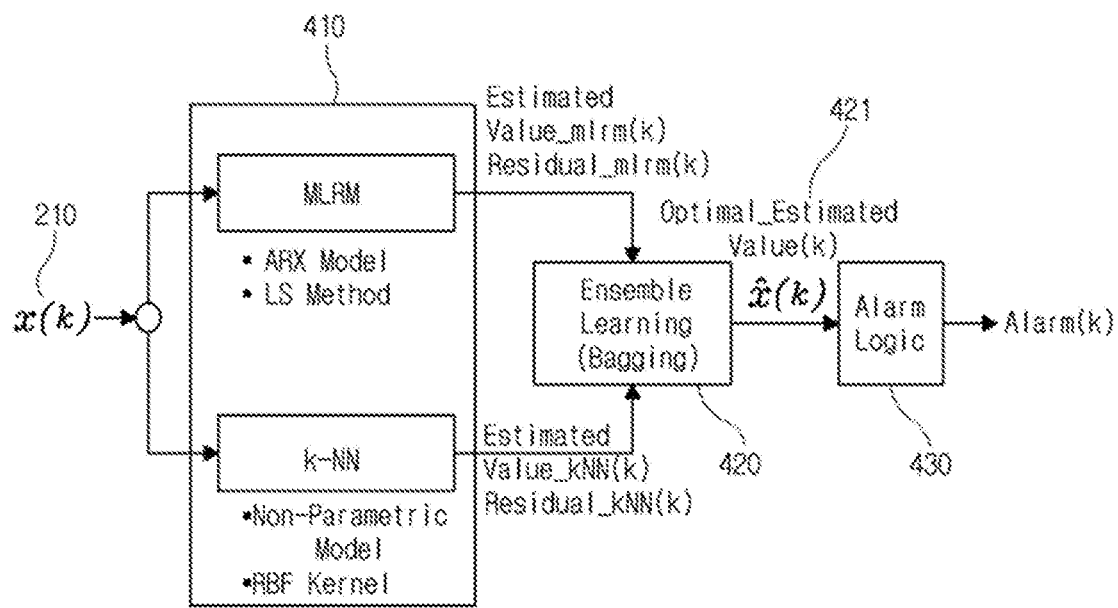

[FIG. 5]
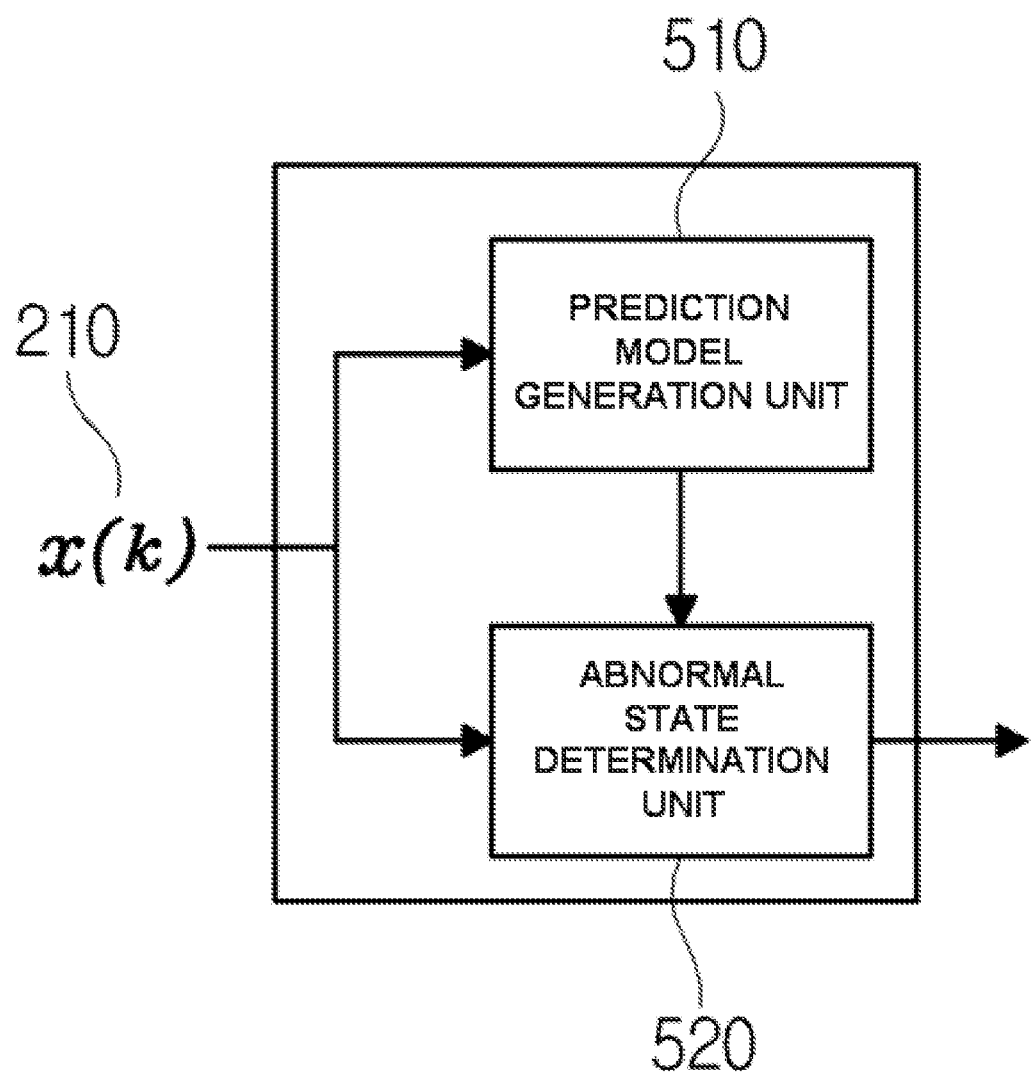

[FIG. 6]
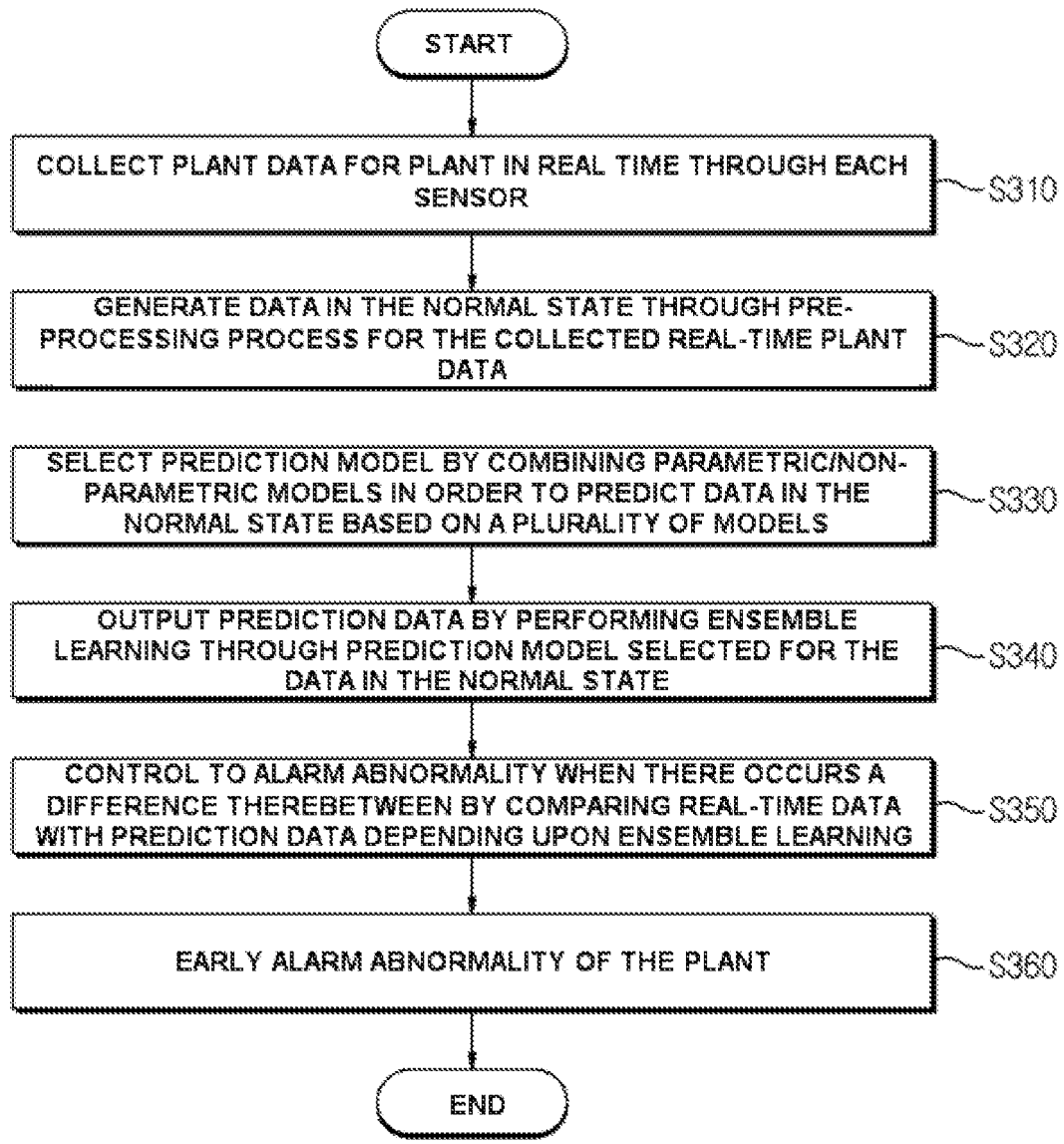

[FIG. 7]
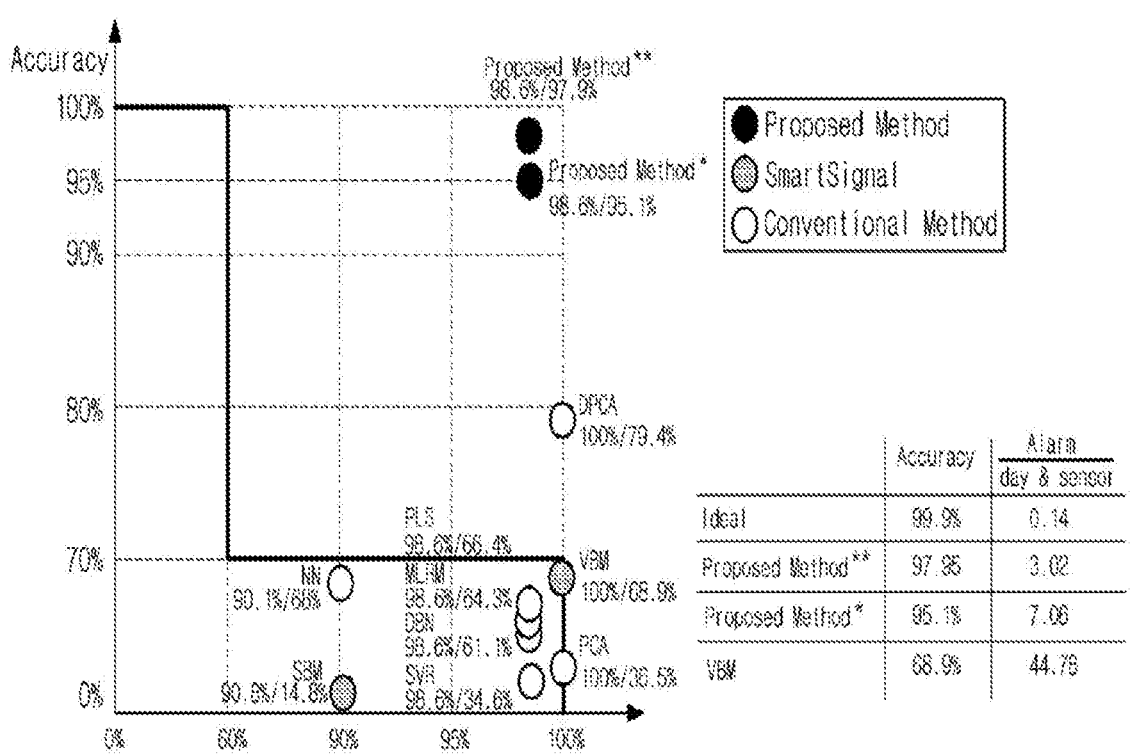

PLANT ABNORMALITY DETECTION METHOD AND SYSTEM

CROSS-REFERENCE TO RELATED APPLICATIONS

This application is a national stage of International Application No. PCT/KR2016/009554, filed 26 Aug. 2016, which claims the benefit of priority to Korean Application(s) No. 10-2016-0055411, filed 4 May 2016 in the Korean Intellectual Property Office, the disclosures of which are incorporated herein by reference.

TECHNICAL FIELD

The present disclosure relates to a plant abnormality detection method and system, and more particularly, to a plant abnormality detection method and system, which can collect plant data in real time, predict data in a normal state by learning the collected data, and diagnose abnormality by comparing the real-time plant data with the prediction data in the normal state; and diagnose abnormality by combining the prediction values based on a plurality of prediction models having different characteristics of a parametric model and a non-parametric model to generate a prediction value having the highest accuracy, thus early detecting accurately plant abnormality to provide an alarm thereto.

BACKGROUND ART

Generally, large plants such as power generation or chemistry are operated in a complex connection with hundreds of machine and electric equipments of various kinds. The plants should constantly monitor abnormality symptom, which become the beginning of an accident, in order to secure reliability to supply power stably.

Accordingly, a monitoring device is used for detecting whether or not a major component constituting the plant is damaged in real time and generating an alarm to an operator when abnormality symptom is found in the component.

Conventional monitoring device generates an alarm to an operator when a crack is detected to simply occur in a component. The operator can recognize that a crack has occurred in the component, but since the extent of the damage is unknown, he/she stops the operation immediately after confirming the alarm and decides whether to repair it.

Accordingly, there is a problem in that evaluation and maintenance are performed after the operation is stopped even when the degree of crack occurrence is small, such that operation efficiency can be reduced.

Accordingly, there is a need for a technique for early warning in advance to take a prompt action when operation parameters related to a specific equipment of the plant are approaching a risk state out of the normal operation state.

DISCLOSURE

Technical Problem

An object of the present disclosure for solving the above problem is to provide a plant abnormality detection learning system and method, which can collect plant data in real time, predict data in a normal state by learning the collected data, and diagnose abnormality by comparing the real-time plant data with the prediction data in the normal state; and diagnose abnormality by combining the prediction values based on a plurality of prediction models having different characteristics of a parametric model and a non-parametric model to generate a prediction value having the highest accuracy, thus early detecting accurately plant abnormality to provide an alarm thereto.

Technical Solution

A plant abnormality detection system in accordance with the present disclosure for achieving the object can include a data collection unit for collecting plant data; a learning model selection unit for selecting a plurality of models having a parametric model and a non-parametric model in order to predict a value of the plant data; and an abnormality alarm unit including a prediction algorithm unit having a plurality of prediction algorithms that apply an optimization algorithm to each of the plurality of models selected by the learning model selection unit, an ensemble learning unit for outputting a final prediction data by performing ensemble learning based on the prediction data outputted from the prediction algorithm unit, and an alarm logic for determining whether or not the plant is abnormal by comparing the data collected in the data collection unit with the final prediction data. In addition, the plant abnormality detection system can further include a data learning unit for deleting the data that the plant has been determined to be in the abnormal state among the plant data collected in the data collection unit, and generating learning data by extracting only the data when the plant has been determined to be in the normal state, and a modeling unit for optimizing a prediction model in order to generate an output similar to the plant by learning each of the prediction models using the learning data generated in the data learning unit; and the learning model selection unit can select a part or all of the prediction models as the plurality of models. Herein, the prediction model can include at least one of a First Principles based Model, a State Space Model, an Auto Regressive eXogenous (ARX) model, a Nonlinear Auto Regressive eXogenous (NARX) model, a Finite Impulse Response (FIR) model, an Auto Regressive Moving Average with eXogenous terms (ARMAX) model, a Non Parametric Model (NPM), a Tree Model (TM), and a Neural Network Model (NNM).

Then, the alarm logic generates as residual by calculating a difference between the final prediction data and the plant data collected in the data collection unit, and determines that the plant is in the abnormal state when the generated residual exceeds a predetermined allowance value; and the plurality of prediction algorithms apply different optimization algorithms to each of the plurality of models, and in addition, the prediction algorithm can include a Regression method for predicting the correlation between parameters and a clustering method for performing prediction by grouping those with similar attributes to create a cluster.

A plant abnormality detection method in accordance with the present disclosure for achieving the object can include (a) a data collection unit collecting plant data for a plant; (b) a learning model selection unit selecting a plurality of models having a parametric model and a non-parametric model in order to predict a value of the plant data; (c) a plurality of prediction algorithms, which apply an optimization algorithm to each of the plurality of models, generating prediction data; (d) an ensemble learning unit outputting a final prediction data by performing ensemble learning based on the prediction data; and (e) an alarm logic determining whether or not the plant is abnormal by comparing the data collected in the data collection unit with the final prediction data. In addition, the plant abnormality detection method can further include (f) deleting plant data in the abnormal state among the plant data collected in the data collection unit, and generating learning data by extracting only the data when the plant has been determined to be in the normal state, and (g) optimizing a prediction model in order to generate an output similar to the plant by learning each of the prediction models using the learning data generated in the data learning unit; and the (b) can include selecting a part or all of the prediction models as the plurality of models.

Then, the (e) can include generating as residual by calculating a difference between the final prediction data and the plant data, and determining that the plant is in the abnormal state when the generated residual exceeds a predetermined allowance value; the (c) can include outputting the prediction data by applying different optimization algorithms to each of the plurality of models; and the plurality of prediction algorithms can include a Regression method for predicting the correlation between parameters and a clustering method for performing prediction by grouping those with similar attributes to create a cluster.

Advantageous Effects

According to the present disclosure, it is possible to enhance prediction accuracy through the ensemble learning using the plurality of prediction models, such as the parametric model and the non-parametric model, with respect to the prediction data for collecting sensor data from the plant and detecting the abnormal state.

In addition, it is possible to use the plurality of prediction models having different characteristics of the parametric model and the non-parametric model, thus further enhancing the advantages of specific single models for the learning model and supplementing the weaknesses thereof to provide the prediction data having the highest accuracy.

Then, it is possible not only to accurately detect the abnormality of the plant with the enhancement of prediction accuracy to early provide the alarm, but also to significantly reduce the rate of erroneous alarm occurrence, thus constructing a reliable plant abnormality detection system.

DESCRIPTION OF DRAWINGS

FIG. 1 is a block diagram schematically illustrating a functional block of a plant abnormality detection system in accordance with an embodiment of the present disclosure.

FIG. 2 is a diagram illustrating a modeling unit 160 for generating prediction models including a plurality of parametric models 161, 163 and non-parametric models 165, 167 in accordance with an embodiment of the present disclosure.

FIG. 3 is a diagram illustrating that each of the models 161, 163, 165, 167 of the modeling unit 160 is composed of a model unit 310 and an optimization unit 320.

FIG. 4 is a diagram illustrating an abnormality alarm unit 140 including a prediction algorithm unit 410, an ensemble learning unit 420, and an alarm logic 430.

FIG. 5 is a diagram illustrating a simplified block diagram of the plant abnormality detection system in accordance with an embodiment of the present disclosure.

FIG. 6 is a flowchart for explaining the plant abnormality detection method in accordance with an embodiment of the present disclosure.

FIG. 7 is a diagram illustrating the accuracy of the prediction result by a combination of the parametric model and the non-parametric model and the ensemble learning in accordance with an embodiment of the present disclosure, and the prediction result of the conventional method.

BEST MODE

Hereinafter, embodiments of the present disclosure will be described in detail with reference to the accompanying drawings so that those skilled in the art to which the present disclosure pertains can easily practice the embodiments of the present disclosure. The present disclosure can be embodied in many various forms and is not limited the embodiments described herein.

Descriptions of irrelevant components are omitted so as to clearly describe the present disclosure, and throughout this specification, the same or like elements are denoted by the same reference numerals.

Throughout this specification, when an element is referred to as being "connected" to another element, it can be "directly connected" to the other element or "electrically connected" to the other element with other elements interposed therebetween. In addition, when an element is referred to as "comprises" another element, the element is intended not to exclude one or more other elements, but to further include one or more other elements, unless the context clearly indicates otherwise.

When it is described that any one part is "on" the other part, the part can be directly on the other part or any other part can be interposed therebetween. On the contrary, when it is described that any one part is "directly on" the other part, there is no other part interposed therebetween.

The terms "first," "second," "third" and the like are used to illustrate different parts, components, areas, layers and/or sections, but are not limited thereto. These terms are only used to differentiate a certain part, component, area, layer or section from other part, component, area, layer or section. Accordingly, a first part, component, area, layer or section, which will be mentioned hereinafter, can be referred to as a second part, component, area, layer or section without departing from the scope of the present disclosure.

The terminology used herein is for the purpose of describing particular embodiments only and is not intended to limit the present disclosure. As used herein, the singular forms are intended to include the plural forms as well, unless the context clearly indicates otherwise. The terms "comprises" when used in this specification, specify the presence of stated features, regions, integers, steps, operations, elements, and/or components, but do not preclude the presence or addition of one or more other features, regions, integers, steps, operations, elements, and/or components.

Terms "below", "above", and the like indicating a relative space can be used to more easily describe a relationship between one part illustrated in the drawings with another part. These terms are intended to include other meanings or operations of a device that is being used, in addition to meanings intended in the drawings. For example, when the device in the drawing is inverted, any parts described as being "below" other parts can be described as being "above" the other parts. Accordingly, the exemplary term "below" includes both of an upper direction and a lower direction. The device can rotate by 90° or other angles, and the terms indicating a relative space are also interpreted according thereto.

Unless otherwise defined, all terms (including technical and scientific terms) used herein have the same meaning as commonly understood by one of ordinary skill in the art to which this disclosure belongs. The terms, such as those defined in commonly used dictionaries, should be additionally interpreted as having a meaning that is consistent with their meaning in the context of the relevant art and/or the present disclosure, and will not be interpreted in an idealized or overly formal sense unless expressly so defined herein.

Hereinafter, exemplary embodiments of the present disclosure will be described in detail with reference to the accompanying drawings so that those skilled in the art can easily practice the present disclosure. However, the present disclosure can be implemented in various different forms, and is not limited to the exemplary embodiments described herein.

FIG. 1 is a block diagram schematically illustrating a functional block of a plant abnormality detection system in accordance with an embodiment of the present disclosure.

Referring to FIG. 1, a plant abnormality detection system in accordance with the present disclosure can include a data collection unit 110, a learning model selection unit 120, and an abnormality alarm unit 140. Herein, the plant abnormality detection system can further include a data learning unit 130, a modeling unit 160, a control unit 150, and a diagnostic database (DB) 170.

The data collection unit 110 can collect plant data in real time through specific equipment of the plant or measurement sensors installed at specific points. The data collected in real time can be gathered at regular intervals and used for modeling, prediction, diagnosis, etc. For example, when the interval is 5 minutes, data for every 5 minutes is collected into one data group, and a data group can be continuously generated for every 5 minutes to be used for modeling, prediction, diagnosis, etc.

The data learning unit 130 can process the data collected in the data collection unit 110 to extract learning data for creating a prediction model. More specifically, the collected real-time data can include not only data in the normal state, which is the data when the plant is operated in the normal state, but also data in the abnormal state, which is the data when the plant is operated in the abnormal state, such that the data learning unit 130 can extract or generate only the data in the normal state from the real-time data collected through a pre-processing process to extract learning data for creating a prediction model.

Herein, the pre-processing process is a process for deleting the data in the abnormal state, and can review the data measured in real time to determine the abnormality thereof by various methods. The pre-processing process can delete the data that is determined to be the abnormal state to extract or generate learning data.

The modeling unit 160 can generate a prediction model using the learning data extracted in the data learning unit 130. The prediction model can include a plurality of parametric models 161, 163 and a plurality of non-parametric models 165, 167. Then, each model of the modeling unit 160 can include the model unit 310 and an optimization unit 320.

FIG. 2 is a diagram illustrating the modeling unit 160 for generating a prediction model having a plurality of parametric models 161, 163 and non-parametric models 165, 167 in accordance with an embodiment of the present disclosure.

FIG. 3 is a diagram illustrating that each of the models 161, 163, 165, 167 of the modeling unit 160 is composed of the model unit 310 and the optimization unit 320.

The parametric model is a model that represents a system using finite number of parameters. That is, the parametric model can describe the system using a limited number of parameters. The parametric model can use a First Principles based Model, a Transfer Function Model, a State Space Model, etc. Herein, the First Principles based Model is a model that uses as parameters those defined by basic and fundamental physics first law, the State Space Model can be a model that uses state variables as parameters, and the Transfer Function Model can be a model that uses as parameters variables specifying a transfer function between input and output. Herein, the Transfer Function Model can include Auto Regressive eXogenous (ARX), Nonlinear Auto Regressive eXogenous (NARX), Finite Impulse Response (FIR), Auto Regressive Moving Average with eXogenous terms (ARMAX) models, etc.

The non-parametric model is a model that can use an infinite number of parameters to represent a plant, and can include a Non Parametric Model (NPM), a Tree Model (TM), a Neural Network Model (NNM), etc. Although the non-parametric model can conceptually use an infinite number of parameters, only a finite number of parameters are actually used to represent the model.

Each of the models 161, 163, 165, 167 of the modeling unit 160 generates an optimal prediction model for each method by applying learning data x(k) 210 extracted in the data learning unit 130 to optimize it in the optimization unit 320 based on each method described above for modeling the plant. In this time, the used optimization algorithm can include a Least Squares Method (LSM) that minimizes the square value of the error, a Maximum Likelihood Method (MLM) that finds the most similar value, a Principal Component Analysis (PCA) for more accurate modeling by reducing the dimension of data using orthogonal transform that transforms correlated learning data into a set of linearly uncorrelated values, a Dynamic Principal Component Analysis (DPCA) that is a dimensionality reduction technique considering time series by combining the concept of time with the PCA, a Partial Least Squares (PLS) that combines PCA with the regression technique, etc.

As an embodiment, in order to generate an optimization prediction model for the ARX method, the model unit 310 can define parameters, mathematical expressions, etc. necessary for the ARX method. The following equation represents the equation for obtaining the output for a general ARX method.

$$A(z)y(k)=B(z) \times (k-n)+e(k)$$

Here, $e(k)$ is the error-related information of the plant to be modeled, and $A(z)$ and $B(z)$ are polynomials for a backward delay operator ($z^{-1}$) and can be a parameter specifying the ARX method. Accordingly, the model unit 310 can determine the number of the polynomials in the general ARX method such as the above equation. In this time, by increasing the number of polynomials, a more optimal ARX model for the plant can be generated, but the computing power required to compute it and the time it takes to stabilize can be longer. The optimization unit 320 can determine the parameters $A(z)$ and $B(z)$ for optimizing to create the model selected in the model unit 310 similar to the plant using the input data x (k), 210.

The learning model selection unit 120 can select and combine an optimal prediction model suitable for current situation of the plant among the plurality of prediction models generated in the modeling unit 160. As described above, both the parametric model and the non-parametric models have their advantages and disadvantages.

Table 1 illustrates advantages and disadvantages of one parametric model and one non-parametric model that can be applied to the present disclosure.

TABLE 1

| | Model | Advantages | Disadvantages |
|---|---|---|---|
| Parametric model | ARX model | elaborate model design available | model considering results, not a process |

TABLE 1-continued

| Model | | Advantages | Disadvantages |
|---|---|---|---|
| | | exert very good performance famous model in engineering high usage easy model analysis non-linear modeling available | of a system state MIMO system modeling difficulty very insufficient expression use in video, voice recognition fields |
| Non-Parametric Model | Non-Parametric Model | can exert good performance upon applying together with technology such as k-NN | DB construction for very elaborate learning data required severe prediction performance dispersion depending upon elaboration of model |
| | CNN Model | very good expression good model performance compared to general NN good performance for image processing informative model when a model structure design is difficult good MIMO system modeling | model analysis impossible occurrence of many Local Optimization no guarantee for creating elaborate model |

As illustrated in Table 1, the advantages and disadvantages of each model can be clear, such that in order to generate a more accurate prediction model, it is possible to combine a plurality of models having different characteristics to generate a prediction model in order to select the function corresponding to the advantages of each model and to supplement the function corresponding to the weaknesses thereof.

As an example, it is possible to select the ARX and ARMAX models as the parametric model among the plurality of prediction models generated in the modeling unit 160, and to generate the NPM or the NNM as the non-parametric model. The prediction model can be generated by combining the plurality of the thus selected models.

The abnormality alarm unit 140 can estimate a prediction value in each prediction algorithm that performs optimization based on the prediction model generated in the learning model selection unit 120, generate an optimal prediction value by performing ensemble learning based on the prediction values, determine the abnormality by comparing the prediction value and the actually measured value, and generate an alarm when it is determined to be abnormal.

FIG. 4 is a diagram illustrating the abnormality alarm unit 140 including a prediction algorithm unit 410, an ensemble learning unit 420, and an alarm logic 430.

Referring to FIG. 4, the prediction algorithm unit 410 can acquire a prediction value for each prediction algorithm applying the optimization to the prediction model generated in the learning model selection unit 120. In this time, the optimization algorithm used in the prediction algorithm can use the optimization algorithm used in the modeling unit 160 described above. Table 2 illustrates performance constraints and reviewed results of the core technology of the prediction algorithm, and based on the reviewed results, it is possible to determine which model to use and which optimization algorithm to apply in the learning model selection unit 120.

TABLE 2

| Core Technology | Performance constraints | Reviewed results |
|---|---|---|
| NN based HTM | Optimization for each model required Optimization with 50 setting variables difficulty No formalized design method No recognized in academia License issues | Non-suitability (but, usable when precise detection for specific fault is required) |
| DPCA PLS MLRM | Severe performance variation depending upon (DPCA) time setting, need optimization for each model (Common) due to Multivariate Regressive method, an error occurs that the abnormality is detected in another sensor at the corresponding timing, upon detecting the abnormality in a specific sensor | High suitability upon applying optimization algorithm Very suitable in terms of implementation and performance |
| k-NN (VBM) | Prediction precision can be reduced when a signal of a pattern, which was not existing due to severe performance variation depending upon the elaboration of model, is incoming | Suitable in terms of implementation and performance. Particularly, very accurate prediction available when creating an elaborate model |
| NN based DBN | Optimization for each model required Optimization difficulty due to a risk of Local Optimization No formalized design method Weak dynamic data | Non-suitability due to insufficient performance |
| SVM based SVDD SVR | Large influence on data sampling Severe performance variation depending upon Kernel and variables setting | Non-suitability due to insufficient performance |

As a prediction algorithm, there is a regression method for predicting the correlation between parameters and a clustering method for performing prediction by grouping those having similar attributes to create a cluster, and in the present disclosure, both the regression method and the cluster method can be used, but only the regression method will be described below.

The regression method can be classified into a model-based method and an algorithm-based method. The model-based method can use a plurality of regression models. The regression model is to model linearly or nonlinearly the correlation between a dependent variable (prediction value in the present disclosure) and one or more independent variables (plant data in the present disclosure). The algorithm-based method includes a k-NN method. In the present disclosure, an optimal prediction value has been extracted using both the model-based method and the algorithm-based method.

Referring to an example of FIG. 4, the prediction algorithm unit 410 can extract one prediction value (Estimated Value_mlrm(k)) and one error value (Residual_mlrm(k)) for the ARX model, which is one of models selected in the learning model selection unit 120, using an algorithm based on the MLRM that is an optimal model using the LSM, and extract another prediction value (Estimated Value_kNN(k)) and another error value (Residual_kNN(k)) for the NPM that is another model by applying k-NN-based algorithm. In this example, the prediction algorithm unit 410 can select and optimize two models from the learning model selection unit 120 to generate a prediction value, but select additional models and perform optimization to generate a prediction value. That is, it is possible to select four or eight models, and perform optimization for each model to extract a prediction value.

The ensemble learning unit 420 can extract an optimal prediction value based on the prediction value extracted for each model. Ensemble learning means using a plurality of learning algorithms in order to obtain better prediction performance than using separately. In the present disclosure, in order to increase the accuracy of prediction values, a plurality of prediction models having different characteristics are selected, and the ensemble learning is used to estimate an optimal prediction value based on the prediction value in each prediction model.

The ensemble learning unit 420 can use various algorithm methods in order to estimate the most accurate prediction value based on the estimated prediction values in each prediction model, and there can be a bagging method by a majority vote without multiplying the prediction value estimated in each prediction model by a weighted value, or a weighted boosting method of estimating it by multiplying the prediction value estimated in each prediction model by a weighed value and adding thereto, etc. In addition, there can be a Mixture of Experts method of using a value of another prediction model for each specific region of data, etc. As an embodiment of applying the above-described bagging method, the prediction algorithm for each prediction model of the prediction algorithm unit 410 generates the prediction value (Estimated Value) and the error (Residual) value to deliver it the ensemble learning unit 420. The ensemble learning unit 420 to which the bagging method is applied can select a prediction model having the smallest error value and select a prediction value of the prediction model as an optimal prediction value.

As described above, the optimal prediction value 421 estimated in the ensemble learning unit 420 is delivered to the alarm logic 430 in order to determine the abnormal state of the plant. The alarm logic 430 can generate as residual a value obtained by subtracting the prediction value from the actually measured value using the optimal prediction value 421 estimated in the ensemble learning unit 420 and the actually measured value, and when the generated residual value exceeds an allowance value, can determine as the abnormal state to output an alarm, and display a warning about the abnormality.

The control unit 150 can perform a control such as setting parameters necessary for each unit of the plant abnormality detection system described above. That is, the data collected in real time in the data collection unit 110 can be collected at certain intervals (e.g., 5 minutes or 10 minutes) to be used for modeling, prediction, diagnosis, etc., and the control unit 150 can deliver the information on the certain interval to the data collection unit 110. In addition, the learning model selection unit 120 can select a plurality of prediction models depending upon the plant environment to be modeled, and for this purpose, the control unit 150 can deliver the information on the plant environment to the learning model selection unit 120. In addition, the control unit 150 can provide the abnormality alarm unit 140 with the information on the allowance value used for determining the abnormal state in the abnormality alarm unit 140.

The diagnostic database 170 can store the cases where the abnormality has occurred in the plant as diagnostic data. Herein, the data on the cases in which the abnormality occurred uses the plant data measured in real time as the actually measured values, and uses the data in the normal state learned in accordance with the present disclosure described above as the prediction value to generate the value obtained by subtracting the prediction value from the actually measured value as residual, to determine as the abnormal state when the generated residual value exceeds the allowance value, and to separately store the plant data in the abnormal state when the abnormal state occurred and the plant data in the normal state therein. In addition, the diagnostic database 170 can store each cause of the abnormal state corresponding to each plant data of the abnormal state. More specifically, in response to the alarm generated when the abnormal state occurred, the manager can check the plant, thereby recognizing the cause and result of the abnormal state. The control unit 150 can store the cause and result of the abnormal state to be received by the manager in the diagnostic database 170 together corresponding to each plant data of the abnormal state.

Thereafter, the control unit 150 can compare the plant data in the abnormal state stored in the diagnostic database 170 with the plant data when it is determined as the abnormal state by the abnormality alarm unit 140, and thereby, when similar data is present, it can automatically inform the manager of the cause based on the cause and result information of the abnormal state stored in the diagnostic database 170 and also take action accordingly.

Until now, the plant abnormality detection system has been described. In the above description, the plant abnormality detection system can be divided into a prediction model generation unit 510 for generating a prediction model and an abnormal state determination unit 520 for generating a prediction value based on the prediction model generated in the prediction model generation unit 510 to determine the abnormal state of the plant based on the above. FIG. 5 is a diagram illustrating a simplified block diagram of the plant abnormality detection system in accordance with an embodiment of the present disclosure.

As described above, the prediction model generation unit 510 can generate an optimal prediction model using the plant data 210 that is input based on a plurality of parametric models or a plurality of non-parametric models, and the abnormal state determination unit 520 can estimate a prediction value for each of the plurality of prediction models generated in the plant data, and estimate an optimal prediction value through the ensemble learning method. Herein, the prediction model generation unit 510 can include the data learning unit 130, the modeling unit 160, and the learning model selection unit 120 that are described above, and the abnormal state determination unit 520 can include the abnormality alarm unit 140 including the prediction algorithm unit 410, the ensemble learning unit 420, and the alarm logic 430. Then, the prediction model generation unit 510 and the abnormal state determination unit 520 can operate independently. That is, in the above description, although the prediction model generation unit 510 and the abnormal state determination unit 520 are described as being executed at the same time, they can be also executed at different times. For example, a prediction model can be generated based on the material during a trial run, and thereafter, during operation, the abnormal state can be determined by comparing a sensor actually measured value and the prediction value obtained based on the prediction model. In this case, the prediction model generation unit 510 and the abnormal state determination unit 520 can also operate at different times. Alternatively, the prediction model generation unit 510 and the abnormal state determination unit 520 can be simultaneously executed and the modeling unit 160 can be used as the prediction algorithm unit 410 as it is.

FIG. 6 is a flowchart for explaining a plant abnormality detection method in accordance with an embodiment of the present disclosure.

Referring to FIG. 6, in the plant abnormality detection system 100 in accordance with the present disclosure, the data collection unit 110 can collect plant data in real time through each sensor S310.

That is, the data collection unit 110 can collect corresponding sensor data through each measurement sensor installed in each device of the plant or each point thereof (Data Collecting), and sequentially receive the sensor data from each measurement sensor depending upon a batch scheduler to store it in the database as raw data.

Then, the data learning unit 130 generates learning data through a pre-processing process for the collected real-time data S320. That is, the data learning unit 130 deletes the abnormal data through the pre-processing process on the collected real-time data to generate learning data used for creating a prediction model. Accordingly, the pre-processing process is a process for deleting the data in the abnormal state, and can determine the abnormality in various methods by reviewing the data measured in real time. The learning data can be extracted or generated by deleting the data when it is determined to be in the abnormal state.

The learning model selection unit 120 can select and combine an optimal prediction model that meets the situation of current system among the plurality of prediction models. Particularly, as illustrated in FIG. 2, a prediction model can be selected by predicting based on a plurality of models having different characteristics and combining the parametric model and the non-parametric model in order to enhance the reliability of prediction S330.

In this time, the learning model selection unit 120 can select a learning model in the parametric model and the non-parametric model by combining the plurality of prediction models having different characteristics in order to select the function corresponding to the advantage of the specific single models and to supplement the functions corresponding to the weakness thereof. That is, each model has its own feature and performance constraint, such that it is possible to grasp the constraint and the feature existing in the system to be predicted, thus selecting a plurality of models suitable for them. The advantages and disadvantages of the parametric model and the non-parametric model are illustrated in Table 1 described above.

In addition, in selecting the model in the learning model selection unit 120, it is necessary to perform modeling for each model to be matched with the plant. For this purpose, the modeling unit 160 can generate a prediction model using the learning data extracted in the data learning unit 130. That is, the prediction model generated in the modeling unit 160 can be optimized using the data collected from the plant to be predicted based on the models such as Auto Regressive eXogenous (ARX), Nonlinear Auto Regressive eXogenous (NARX), Finite Impulse Response (FIR), Auto Regressive Moving Average with eXogenous terms (ARMAX) models, State Space Model (SSM), First Principles based Model (FPBM), Non Parametric Model (NPM), Tree Model (TM), and Neural Network Model (NNM). Accordingly, the prediction model generated in the modeling unit 160 can be a model optimized for the plant to be predicted based on the specific model. The learning model selection unit 120 can select and combine a plurality of prediction models suitable for the plant among the optimal prediction models generated in the modeling unit 160.

The abnormality alarm unit 140 can estimate a prediction value in each prediction algorithm that performs optimization based on the prediction model generated in the learning model selection unit 120, perform the ensemble learning based on the prediction values to output an optimal prediction value S340, and when the prediction value and the actually measured value measured in real time in the plant is compared to occur the difference that is equal to or greater than a predetermined allowable value, it is determined to be the abnormality to alarm S350.

The prediction value in each prediction algorithm can be estimated by the regression method for predicting the correlation between the variables or by the clustering method for performing prediction by grouping those with similar attributes to create a cluster, and in the present disclosure, both the regression and clustering methods can be used. The regression method can be divided into a model-based method and an algorithm-based method. The model-based method can use a plurality of regression models. The regression model is to model linearly or nonlinearly the correlation between a dependent variable (the prediction value in the present disclosure) and one or more independent variables (the plant data in the present disclosure). The algorithm-based method includes the k-NN method. In the present disclosure, optimal prediction data can be extracted using both the model-based method and the algorithm-based method.

Then, the optimal prediction data can be output based on the prediction data extracted for each prediction algorithm through the ensemble learning. Various algorithms for ensemble learning can be used, and there can be a bagging method by a majority vote without multiplying the prediction data estimated in each prediction model by a weighted value, or a weighted value boosting method for estimating it by multiplying the prediction data estimated in each prediction model by a weighted value and adding thereto, etc. In addition, there can be a Mixture of Experts method of using values of different prediction models for each specific region of data. Particularly, as an embodiment of applying the above-described bagging method, the prediction data of the prediction model having the smallest error value can be selected as an optimal prediction data by comparing the error value obtained together while generating the prediction data in each prediction algorithm.

FIG. 7 is a diagram illustrating the accuracy of the prediction result by a combination of the parametric model and the non-parametric model and the ensemble learning in accordance with an embodiment of the present disclosure, and the prediction result of the conventional method. Referring to FIG. 7, in a first embodiment (Proposed Method*) that performs the ensemble learning based on MLRM, PLS, DPCA, and k-NN models, the prediction result had the accuracy of 95.1%. In addition, in a second embodiment (Proposed Method**) that further optimizes the model by applying an Auto-Learning Algorithm for obtaining the parameters of the prediction model based on the plant data in the normal state that is input from the modeling unit 160, the predicted result had the accuracy of 97.9%. On the contrary, in the conventional DPCA method, the accuracy thereof was 79.4% and the accuracy in the Neural Network (NN) was 68%. From the above results, the plant abnormality detection system and method proposed in the present disclosure can calculate the prediction data with much higher accuracy than the conventional method, thus early detecting accurately the plant abnormality to alarm it.

Meanwhile, the control unit 150 can diagnose the abnormality of the plant and trace the underlying cause using the diagnostic logic based on the diagnostic database 170. Herein, the diagnostic logic is an algorithm that analyzes and searches the underlying cause of the abnormality of the plant based on the diagnostic data when a difference between the real-time plant data and the data in the normal state exceeds an allowance value to generate early alarm. Accordingly, the control unit 150 can analyze and trace the underlying cause of the abnormality of the plant using the diagnostic logic based on the diagnostic data stored in the diagnostic database 170.

As described above, according to the present disclosure, it is possible to achieve the plant abnormality detection learning system and method, which can collect the plant data in real time, to extract the data in the normal state among the collected data, and to combine the prediction values based on a plurality of prediction models having different characteristics of the parametric model and the non-parametric model to generate the prediction value having the highest accuracy to diagnose the abnormality, thus early detecting accurately the abnormality of the plant to provide an alarm.

Those skilled in the art to which the present disclosure pertains should be understood that the present disclosure can be implemented in other various forms without departing from the technical spirit or essential characteristics of the present disclosure, so the aforementioned embodiments should not be construed as being limitative, but should be construed as being only illustrative from all aspects. The scope of the present disclosure is disclosed in the appended claims rather than the detailed description, and it should be understood that all modifications or variations derived from the meanings and scope of the present disclosure and equivalents thereof are included in the scope of the appended claims.

The invention claimed is:

1. A system for detecting abnormality of a plant, the system comprising:
    a data collection unit for collecting plant data, the plant data including first plant data collected when the plant has been determined to be in a normal state and second plant data collected when the plant has been determined to be in an abnormal state;
    a data learning unit for generating learning data by extracting only the first plant data and deleting the second plant data;
    a modeling unit for optimizing a plurality of prediction models in order to generate an output similar to the plant by using each of the plurality of prediction models with the learning data generated by the data learning unit, the plurality of prediction models including a plurality of parametric models and a plurality of non-parametric models;
    a learning model selection unit configured to select the plurality of prediction models in order to predict a value of the plant data collected by the data collection unit; and
    an abnormality alarm unit comprising:
        a prediction algorithm unit for generating prediction data using the plurality of prediction algorithms that apply an optimization algorithm to each prediction model of the plurality of prediction models selected by the learning model selection unit,
        an ensemble learning unit configured to output final prediction data by performing ensemble learning based on the prediction data generated by the prediction algorithm unit, and
        an alarm logic configured to determine whether the plant is in the abnormal state by comparing the plant data collected by the data collection unit with the final prediction data outputted by the ensemble learning unit,
    wherein the learning data generated by the data learning unit is applied to each of the plurality of parametric models and the plurality of non-parametric models of the plurality of prediction models optimized by the modeling unit, to generate a plurality of optimal prediction models including at least one optimal prediction model for each of the plurality of prediction models, and
    wherein the learning model selection unit is further configured to select and combine optimal prediction models of the at least one optimal prediction model that are suitable for a current situation of the plant.

2. The system of claim 1, wherein the plurality of prediction models comprise at least one of a First Principles based Model, a State Space Model, an Auto Regressive eXogenous (ARX) model, a Nonlinear Auto Regressive eXogenous (NARX) model, a Finite Impulse Response (FIR) model, an Auto Regressive Moving Average with eXogenous terms (ARMAX) model, a Non Parametric Model (NPM), a Tree Model (TM), and a Neural Network Model (NNM).

3. The system of claim 1,
    wherein the plurality of parametric models include at least one multiple linear regression model (MLRM) and the plurality of non-parametric models include at least one k-nearest neighbors algorithm (k-NN),
    wherein the alarm logic is further configured to generate a residual value for each of the at least one MLRM and the at least one k-NN by calculating a difference between the final prediction data and the plant data, and to determine that the plant is in the abnormal state when the residual value exceeds a predetermined allowance value, and
    wherein the ensemble learning unit is further configured to select a specific prediction model of the plurality of prediction models that has a smallest residual value, and to set a prediction value of the specific prediction model as the final prediction data.

4. The system of claim 1, wherein the optimization algorithm is different for each prediction model of the plurality of prediction models.

5. The system of claim 4, wherein the plurality of prediction algorithms comprise:
    a regression method for predicting a correlation between parameters; and
    a clustering method for performing prediction by grouping the parameters with similar attributes to create a cluster.

6. The system of claim 5, wherein the Regression method uses a plurality of Regression models.

7. A method for detecting abnormality of a plant, the method comprising steps of:
    (a) collecting plant data, the plant data including first plant data collected when the plant has been determined to be in a normal state and second plant data collected when the plant has been determined to be in an abnormal state;
    (b) generating learning data by extracting only the first plant data and deleting the second plant data;
    (c) optimizing a plurality of prediction models in order to generate an output similar to the plant by using each of the plurality of prediction models with the learning data generated in the step (b), the plurality of prediction models including a plurality of parametric models and a plurality of non-parametric models;
    (d) selecting the plurality of prediction models in order to predict a value of the plant data collected in the step (a);
    (e) generating prediction data using a plurality of prediction algorithms that apply an optimization algorithm to each prediction model of the plurality of prediction models selected in the step (d);

(f) outputting final prediction data by performing ensemble learning based on the prediction data generated in the step (e); and (g) determining whether the plant is in the abnormal state by comparing the plant data collected in the step (a) with the final prediction data outputted in the step (f), wherein the learning data generated in the step (b) is applied to each of the plurality of parametric models and the plurality of non-parametric models of the plurality of prediction models optimized in the step (c), to generate a plurality of optimal prediction models including at least one optimal prediction model for each of the plurality of prediction models, and wherein the plurality of prediction models selected in the step (d) include a selection and combination of optimal prediction models of the at least one optimal prediction model that are suitable for a current situation of the plant.

8. The method of claim 7, further comprising:

generating a residual value by calculating a difference between the final prediction data and the plant data, determining that the plant is in the abnormal state when the residual value exceeds a predetermined allowance value, selecting a specific prediction model of the plurality of prediction models that has a smallest residual value, and setting a prediction value of the specific prediction model as the final prediction data, wherein the plurality of parametric models include at least one multiple linear regression model (MLRM) and the plurality of non-parametric models include at least one k-nearest neighbors algorithm (k-NN), the residual value generated for each of the at least one MLRM and the at least one k-NN.

9. The method of claim 7, wherein the optimization algorithm is different for each prediction model of the plurality of prediction models.

10. The method of claim 9, wherein the plurality of prediction algorithms comprise:

a regression method for predicting a correlation between parameters; and a clustering method for performing prediction by grouping the parameters with similar attributes to create a cluster.

* * * * *